Sept. 1, 1964     R. M. GAGE     3,147,329

METHOD AND APPARATUS FOR HEATING METAL MELTING FURNACES

Filed Aug. 17, 1960     5 Sheets—Sheet 1

INVENTOR.
ROBERT M. GAGE
BY
ATTORNEY

Sept. 1, 1964  R. M. GAGE  3,147,329
METHOD AND APPARATUS FOR HEATING METAL MELTING FURNACES
Filed Aug. 17, 1960  5 Sheets-Sheet 2

INVENTOR.
ROBERT M. GAGE
BY
ATTORNEY

Sept. 1, 1964  R. M. GAGE  3,147,329
METHOD AND APPARATUS FOR HEATING METAL MELTING FURNACES
Filed Aug. 17, 1960  5 Sheets-Sheet 5

INVENTOR.
ROBERT M. GAGE
BY
ATTORNEY

United States Patent Office 3,147,329
Patented Sept. 1, 1964

3,147,329
METHOD AND APPARATUS FOR HEATING
METAL MELTING FURNACES
Robert M. Gage, Summit, N.J., assignor to Union Carbide
Corporation, a corporation of New York
Filed Aug. 17, 1960, Ser. No. 50,194
8 Claims. (Cl. 13—9)

The present invention relates to a novel method and apparatus for heating metal melting furnaces utilizing an electric arc. More specifically it relates to the use of a non-consumable electrode transferred arc torch for such heating operation. This application is a continuation-in-part of my application Serial No. 595,003 filed June 29, 1956 for "Arc Furnaces", now abandoned, which is a continuation-in-part of application Serial No. 524,353, now U.S. Patent 2,806,124.

An electric arc is well known as a source of concentrated thermal energy for metal melting and refining. Apparatus of this nature can be divided into two categories—those utilizing non-transferred arcs whereby the thermal energy generated by the arc is transmitted to the metal charge by means of radiation or a gas stream passed through the arc, and those utilizing arcs maintained between electrodes with the metal charge being part of the circuit, said charge being heated through resistance heating and direct transfer of energy from the arc to the metal charge.

The non-transferred arc heating methods are heretofore known are generally unsatisfactory because of low heat transfer efficiencies and excessive gas consumption. Consequently, such arcs have found only a limited commercial acceptance, their use being limited to relatively small furnaces. The so-called transferred arc heating methods where the metal charge is part of the circuit have been employed commercially for some time; however, a large number of apparatus and operational problems prevail. Among these of major concern are electrode consumption, frequent melt contamination, refractory damage necessitating frequent furnace shutdowns, arc instability, frequent loss of control over the power input to the melt due to gross cycling of electrode mechanisms, need for agitating equipment during meltdown to assure homogeneity of the melt, and dependence of the arc characteristics on the furnace atmosphpere.

Carbon electrodes are generally used in the transferred arc furnaces since these electrodes are readily available and are capable of carrying the high currents normally required. However, carbon electrodes offer several disadvantages, such as appreciable electrode losses caused by erosion, spalling and electrode vaporization. These electrode losses frequently add undesirable amounts of carbon to the melt. This is particularly detrimental where non-ferrous metals are processed, for example titanium. Moreover, because of the electrode losses the relative arc instability, and the need to maintain a specific arc-to-metal-charge distance, expensive, precision electrode feed mechanisms are necessary to continuously adjust the carbon electrode to charge distance. While the carbon electrode consumption is considerably influenced by the production rate, type of metal processed, furnace size and atmosphere, special melting practices and the like, the electrode consumption averages about 15 pounds per ton of the metal charged. In view of these disadvantages attempts have beeen made in the prior art to replace carbon electrodes with other materials such as tungsten. These attempts, although solving some of the existing problems such as large electrode consumption, have also created others like the sensitivity of the tungsten electrodes to furnace atmosphere, melt contamination with undesirable elements, increased cost of the electrodes, and the like.

The metal charge in the crucible usually contains volatiles that aggravate the problem of electrode contamination of the melt. Thus, while normal splash obtained in an arc furnace can sometimes be minimized, the small but severe explosions occurring in the melt because of rapid gas evolution spray the electrode with molten metal particles. In this manner, the tungsten electrode usually is contaminated with the melt material. Contamination also takes place through contact of the electrode with the metal-vapor-laden furnace atmosphere. Such contamination causes severe electrode erosion along with arc instability. Also, the contaminated tungsten electrode erodes much more rapidly and, in turn, contaminates the melt with undesirable elements. Moreover, the hot tungsten electrodes are sensitive to attack by furnace atmosphere.

Furthermore, in the presently used arc furnaces, the arc behavior is characteristically unsteady and not subject to close positional control. Such control is desirable to uniformly melt the metal charge without damage to the walls of the crucible. Also, power fluctuations in the supply lines affect the operation of other electrical equipment nearby, and cause, for example, lighting flicker. Such power fluctuations have made it necessary to considerably oversize the electrical components, such as transformers, of the melting installations, thus markedly increasing the weight and cost of such installations. Moreover, very little control can be achieved over the direction of the arc. As an additional consequence of such behavior and the extensive radiant heat transfer from the arc, excessive refractory damage to the furnace roof and the exposed furnace walls takes place.

Additional difficulties are encountered in the current arc furnace practice because of the erratic dislocations of the arc. As the arc moves around the end of the electrode, it often flashes to one side and alternately lengthens and shortens. Frequently such a high degree of drifting is encountered that the arc is extinguished which requires, most often, that the electrode be momentarily dipped into the molten bath to effect reignition. This, of course, results in some graphite being dissolved by the molten metal which is undesirable both from the standpoint of metal contamination and electrode loss. In addition to the obvious difficulty and inconvenience of re-establishing the arc, this condition also causes wide fluctuations in the power supplied by the arc. A short arc has a low voltage drop and supplies less heat energy to the furnace charge than a long arc at the same current level. Optimum arc length depends to a large extent on the power needs for a particular condition in the furnace and preferably should be variable as the melting and refining treatments progress.

Another problem encountered in metal melting furnaces is the maintainance of a relatively high degree of homogeneity. Various methods of agitation such as rocking of the furnace, creation of a varying magnetic field by use of induction coils, and the like have been proposed and, to some extent, used. However, such agitation methods are costly and involve considerable capital outlay.

Moreover, prior art arc furnaces are quite atmosphere sensitive. In an oxygen rich atmosphere, for example, the rate of electrode consumption is greatly accelerated. In addition, undesirable amounts of oxygen are introduced into the melt by the action of the arc. This problem is also present when non-consumable electrodes are employed. Again, electrode erosion is enhanced and melt contamination occurs. By the same token, if the meltdown is carried out in a nitrogen atmosphere, excessive amounts of nitrogen are introduced in the melt due to the presence of atomic nitrogen in the arc. Thus the use of prior art arc assemblies are essentially limited in the degree of control that can be exercised over melt composition.

It is accordingly an object of the present invention to provide a method and apparatus for the arc heating of a metal melting furnace which avoids excessive electrode consumption and melt contamination by atmospheric gases.

It is a further object to provide such a method and apparatus wherein: the arc is relatively uninfluenced by furnace atmosphere, excellent arc stability is effected and close control over the power supplied to the melt is obtained. It is a further object of the present invention to provide a method and apparatus which permits maintaining close control over arc directional stability while allowing major changes in arc length as may be desired during different phases of furnace processing.

A still further object is to provide such a method and apparatus which gives greatly improved furnace refractory life and provides an arc plasma with sufficient momentum to obviate additional stirring or melt agitation equipment.

Other objects and advantages will be apparent from the following description and drawings in which.

Figure 1:
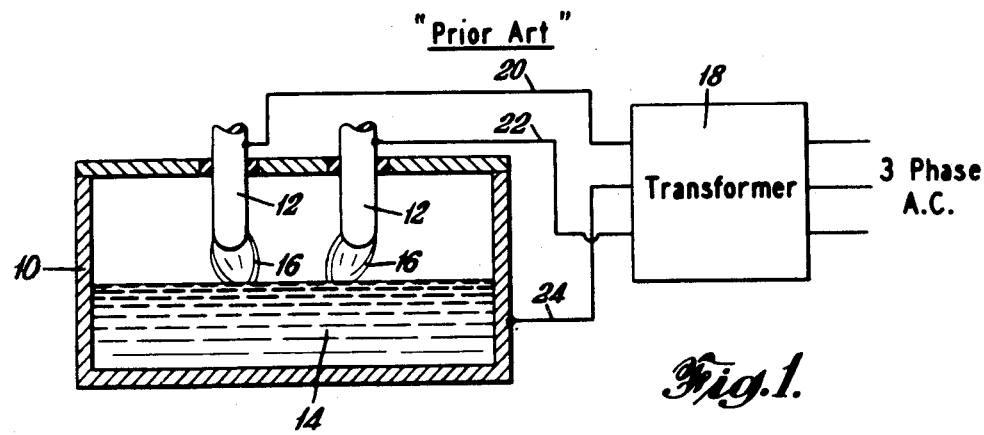
FIG. 1 is a fragmentary view in vertical cross section of prior apparatus.

The objects of this invention are accomplished in general by a method of melting metal in a crucible which comprises forming a quasi-electrode between a non-consumable electrode and the crucible by first striking an arc therebetween, surrounding the electrode with an annular gas stream, subsequently directing at least a portion of said gas stream by means of a cold wall nozzle into intimate contact with said arc, thereby directionally stabilizing same, and wherein said portion of said gas stream is ionized to form an extremely stable arc path. It is the formation of this directionally stable arc column or quasi-electrode which is believed to make possible the many advantages for processing molten metals obtained with the present invention. By "directionally stable arc column" is meant an arc column which remains substantially axially aligned with the electrode and nozzle of the torch when said electrode and nozzle are tilted with respect to the metal melt surface.

As stated above the novel combinations as represented by this invention provide a metal processing apparatus with an arc-torch having an essentially non-consumable electrode. The electrode is absolutely protected from melt spatter on all sides and from above. The gas stream flowing past the electrode through the opening in the cold nozzle surrounding said electrode prohibits the entrance of spatter and fumes into the nozzle. This arrangement prevents electrode erosion and subsequent contamination and, furthermore, eliminates the motivating reason for the trend away from tungsten electrodes as evidenced by the prior art. In addition, the expensive, consumable electrode feed mechanisms have been completely eliminated, thus providing a substantial reduction in capital outlay. Since unexpected arc lengths of from 18 inches to 36 inches are obtained at normal voltages, the arc characteristics are relatively unaffected by melting and consolidation of the charge which in graphite electrode furnaces causes gross changes in voltage and amperage and makes necessary fast-acting automatic electrode handling devices and considerably oversized power supplies, supply cables and associated equipment.

Unusually close control of the hot arc effluent geometry is achieved by the present invention. This feature facilitates positive control over the direction of the arc column which, in turn, provides a much more versatile metal melting furnace suitable for the processing of various forms of metals and alloys such as loose sponge, metal scrap, and the like. Because of this unexpected characteristic the furnace refractory life has been greatly extended rather than lessened as might be expected with a long radiating arc stream. The arc column can be directed so as to achieve the most effective heat transfer to the melt.

The problems of arcing to and puncture of the crucible commonly encountered in cold crucible melting are virtually eliminated because of the excellent directional stability characteristics of the arc column of the present invention.

The stability of the arc column of the present invention is further exemplifified in that it is also extremely insensitive to the proximity of the furnace charge. Arc lengths of about three feet have been achieved without any noticeable effect on the stability of said arc. These characteristics provide for a relatively steady power input level and enable the operator to exercise full control over the arc characteristics such as total voltage across the arc total current input at a given time, and also the control of the power input.

The arc effluent impinging on the surface of the molten furnace charge also provides a substantial degree of agitation of the melt.

Moreover, the apparatus of the present invention is operated independently of the furnace atmosphere. Thus, undesirable side effects common to prior art arc furnaces such as nitrogen and oxygen pumping, dissociation and sorbtion into the metal charge may be eliminated or controlled to the desired degree. Furthermore, the furnace atmosphere can be controlled by a suitable choice of gas passed through the arc torch. This is of particular advantage in the processing of reactive metals such as titanium.

Because of the high-energy-concentration effluent of the present invention, a vaporization and boiling of the molten metal would be expected. While such arc torch characteristics are desirable for welding and metal cutting, they are detrimental to efficient recovery of a metal charge in a crucible. However, the present invention results in a surprisingly effective distribution of energy from the concentrated source with a minimum of metal vaporization and a very substantial increase in the furnace refractory life. In addition, a very quiet arc effluent is achieved, resulting in the minimum of noise, sparking, smoke and the like.

The continuity and effectiveness of the instant arc process effluent is sustained by maintaining a continuous power input to the apparatus by means of an electric power source suitably connected to the torch and the metal charge, using an essentially non-consumable refractory metal electrode in said torch, cooling said electrode, shielding said electrode by means of a fluid-cooled nozzle enveloping said electrode and providing an annular, confined-flow passageway around said electrode, passing a gas stream through said passageway at a linear velocity of at least 5 feet per second past the electrode, and maintaining the metal melting furnace at an absolute pressure of at least 35 millimeters of mercury.

A concept of the present invention may be gained by considering the torch assembly with internal electrode nozzle, and hot gas effluent as a virtual current conducting electrode, possessing the advantages of, say, carbon electrodes without many of the disadvantages. In this analogy, the nozzle assembly can be compared to the clamping arrangement of a carbon electrode, introducing current to the conductive medium and establishing its direction. The conducting gas effluent is essentially a quasi-electrode, having resistivity of the same order of magnitude as a carbon electrode but a higher current-carrying capacity for a relatively smaller cross section.

A pilot arc may be maintained between such electrode and the surrounding nozzle so as to ignite the main arc between the torch electrode and the work metal when the latter are connected to a suitable arc current power source making it unnecessary to contact the electrode and the metal charge. While the main arc can be ignited by touching the electrically connected torch electrode to the metal charge and then withdrawing the electrode to the normal operating distance, this procedure is not satisfactory when the charge is molten. The electrode holder assembly within the torch may be so constructed as to permit such manipulations. Moreover, suitable provisions may be made for the initiation of the pilot arc by touching the torch electrode to the nozzle, said pilot arc, in turn, initiating the main arc.

The invention will now be described in greater detail with reference to the drawings. In FIG. 1 there is shown an old type of furnace 10 in which carbon electrodes 12, are mounted above the melt 14 to produce arcs 16, energized by a three-phase transformer 18 through leads 20, 22, 24 connected to the electrodes and melt, respectively. In such case, the arcs 16 not only flop back and forth but have no definite shape or direction, and the electrodes and melt are subject to contamination. A Scott-connected 3-to-2 phase circuit is shown but any other suitable connection can be applied.

Figure 2:
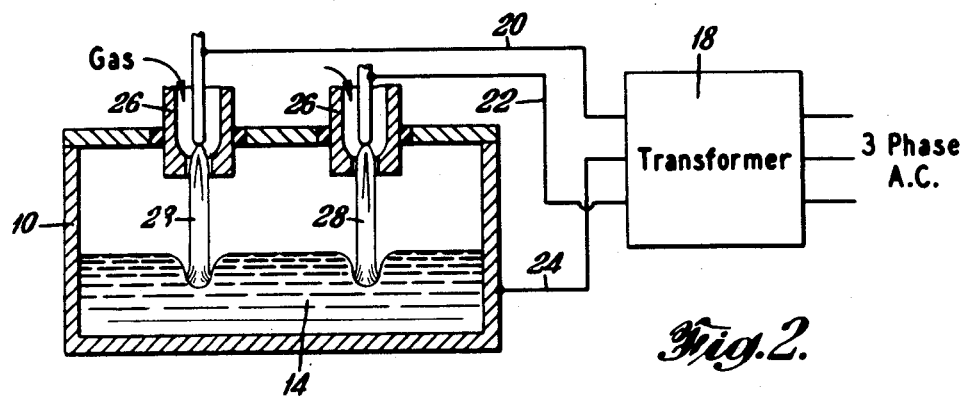
FIG. 2 is a similar view of a dual arc torch furnace illustrating the invention.

FIG. 2 schematically illustrates a multiple-electrode assembly, with a torch 26 and effluent or quasi-electrode 28 of the invention as direct replacement of the carbon electrodes 12. Automatic electrode feeding equipment to maintain the height of the consumable carbons above the melt is not shown and is not needed with the arc torch.

Figure 3:
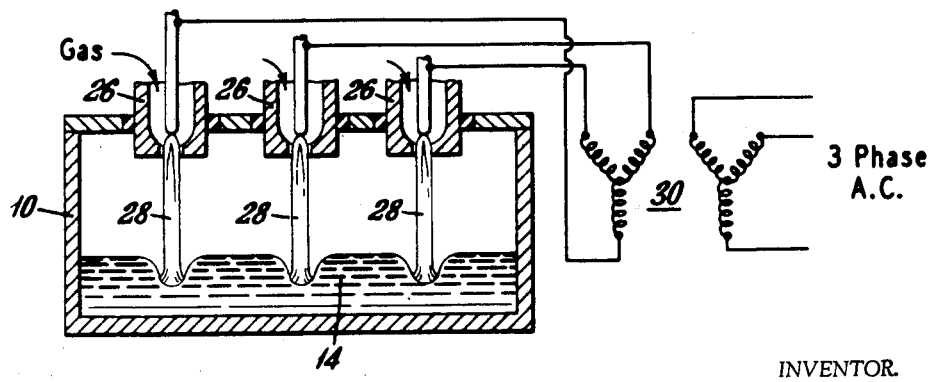
FIG. 3 is a similar view of a three-phase modification.

FIG. 3 illustrates still another example of multiple-electrode assembly involving arc torches 26 and quasi-electrodes 28 of the invention. A three-phase Y—Y power source connection 30 is shown.

Figure 4:
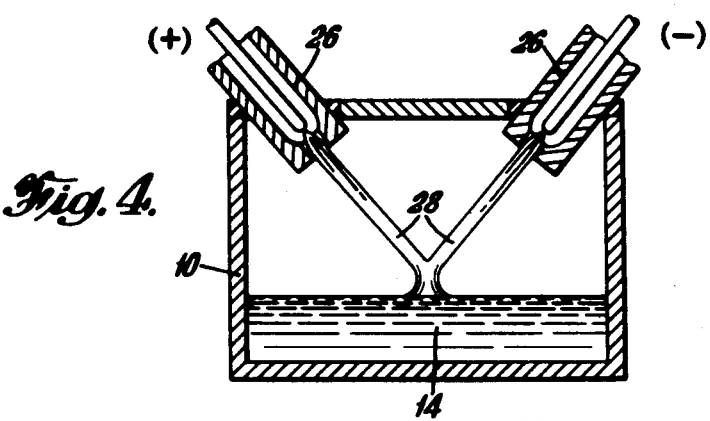
FIG. 4 is a similar view of a convergent twin quasi-electrode modification.

In FIG. 4 the torches 26 are directed so that the effluent gas arc columns 28 impinge on one another just above the metal charge 14. A D.C. series connection is shown with the metal charge not in circuit. It is evident that non-conducting material may be melted in this manner. However, many non-conducting materials become coducting at higher temperatures. Greater heating efficiency is gained if this property is utilized by redirecting the effluents after the non-conducting material has been heated sufficiently to be a conductor, such that two series arcs are formed: (1) negative-to-melt, and (2) melt-to-positive.

Figure 5:
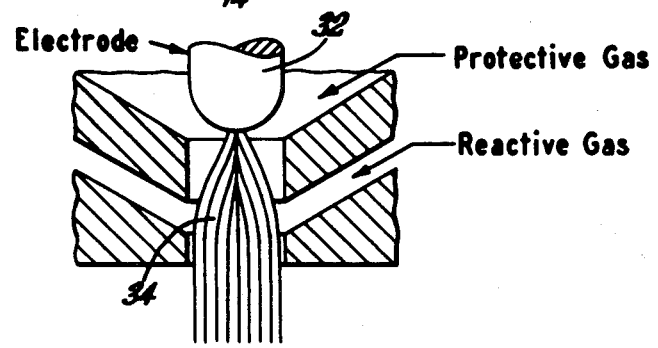
FIGS. 5 and 6 are cross-sectional views of arc torch modifications.

FIG. 5 shows a useful variation of the invention in which two or more gases are used. One gas, such as nitrogen or argon, is used to protect the electrode 32 from deterioration, and another more reactive gas is introduced into the arc column 34 downstream. An example of the usefulness of this arrangement would be in the removal of oxidizable impurities by means of oxygen gas.

Figure 6:
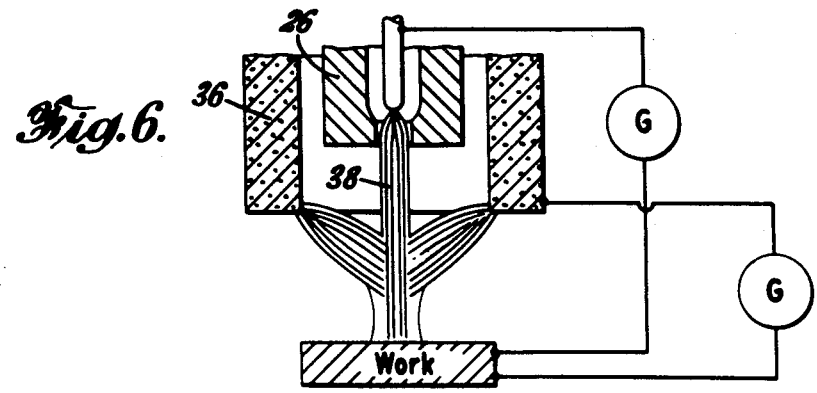

Still another useful variation is that in which the torch of the invention furnishes a gaseous conducting path (having direction, length, and stiffness, in common with solid coductors) to which current from another electrode (or multiple electrodes) can go through a power arc and thence to the metal charge. FIG. 6 shows, for example, an arc torch of the invention surrounded concentrically by a hollow consumable carbon electrode 36, automatically fed to retain its position relative to the central torch. This could function as a means for maintaining the pilot arc.

It is to be understood that the arc process and apparatus disclosed in U.S. Patent No. 2,806,124 issued September 10, 1957, which is the parent application of U.S. Serial No. 595,003 of which this application is a continuation-in-part is included herein by reference.

Figure 7:
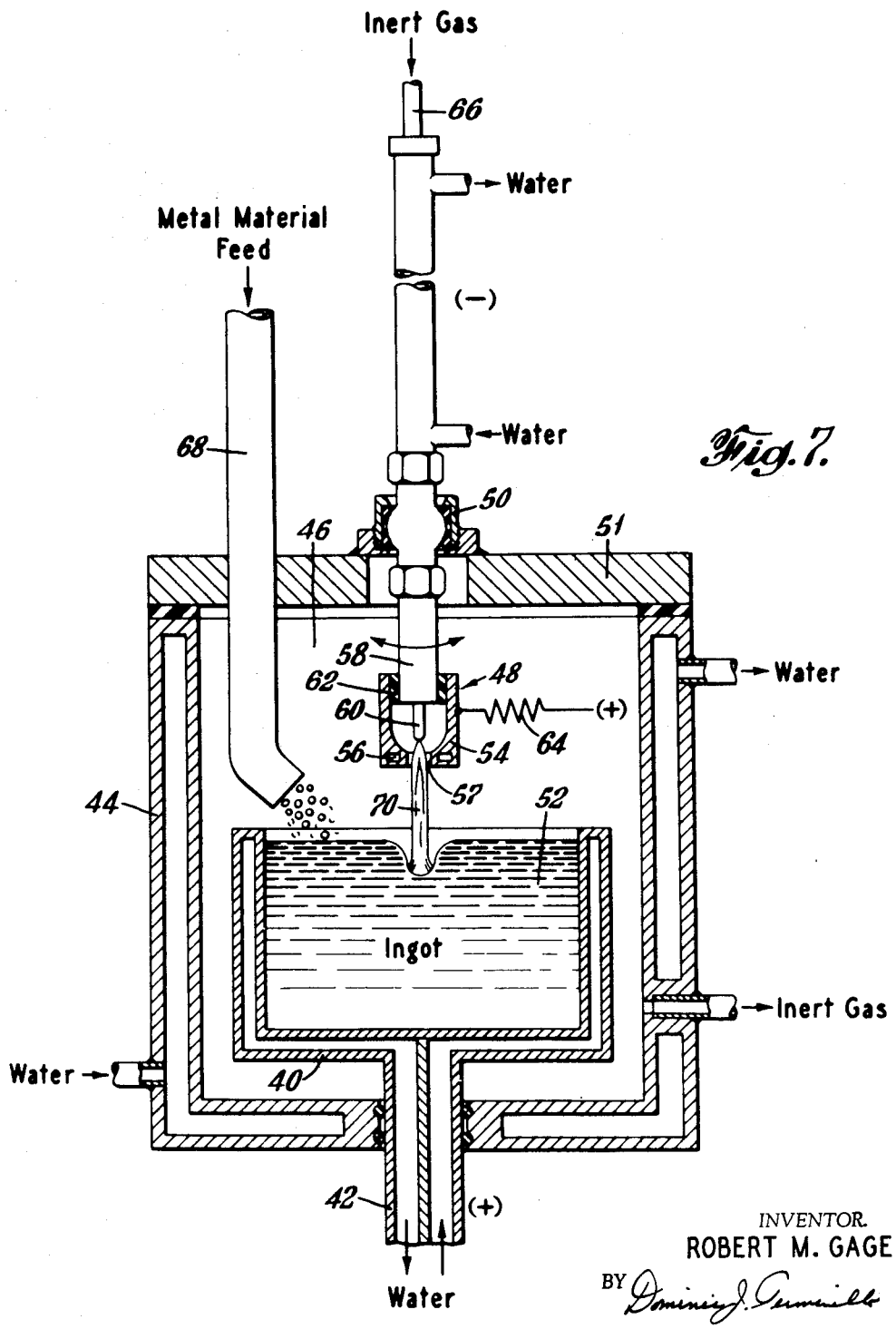
FIG. 7 is a view mainly in cross-section of a furnace embodying the invention for melting reactive metal, such as titanium sponge.

As shown in FIG. 7, a water-cooled crucible 40 is mounted on a suitable elevator 42 within a water-cooled casing 44, providing a closed chamber 46 for the crucible. An arc torch 48 is mounted in a ball-and-socket joint 50 on the cover 51 of casing 44 above the interior of the melt 52 in the crucible 40. It may be desirable to have the arc assembly in a moveable mounting so that the quasi-electrode can be directed to any point on the surface of the metal or other material in the crucible.

The arc torch consists of a metal nozzle 54 that is provided with an annular passage 56 through which a suitable coolant, for example, water is force-circulated to keep cool the inner wall of a central arc passage 57 in such nozzle. A tungsten electrode 60 is mounted within such passage in axial alignment therewith. The nozzle is insulated from the torch body 58 by a ring 62 of insulating material. The electrode 60 is electrically connected to one side of a suitable D.C. source of electrical power, the other side of which is connected to the crucible and, through a ballast resistor 64, to the nozzle. A suitable inert gas such as argon may be delivered under pressure to the torch by way of a pipe 66. Granular (sponge) metal may, for example, be fed to the crucible through a pipe 68.

In operation a pilot arc is first established between the lower end of electrode 60 and the interior of nozzle 54. A main arc is then established between such electrode and the melt 52 to produce the quasi-electrode 70 of the invention.

A primary problem in the arc melting of reactive metals, such as titanium, using a non-consumable electrode is contamination caused by splashing of the metal onto the electrode. The nozzle of the arc torch together with the relatively high velocity of the arc gas effluent prevent such contamination. These advantages apply to the melting of any metal, reactive or not.

The torch of this invention generally consists of a refractory metal electrode supported by a fluid-cooled electrode holder and positioned within the central passage of a fluid-cooled nozzle used to shield the electrode from contamination from the melt and furnace atmosphere. The tip of the cathode can be approximately even with the nozzle outlet and also recessed a slight amount within the nozzle. Means are, furthermore, provided for passing a shielding gas stream around the cathode and out through the nozzle passage to supply additional shielding protection to the cathode.

The apparatus will be described in more detail with respect to FIG. 8 which represents the invention as used at power levels of about 100–2000 kw. in 1–10 ton furnaces. Electrode 80, preferably constructed from refractory metals such as tungsten, tantalum, columbium and molybednum containing minor amounts of emissive materials such as thorium, oxide, yttrium oxide, calcium oxide, cerium oxide, and barium oxide, is supported by electrode holder 82 through press-fit, soldered, or threaded joint 84. For direct-current operation with the electrode as the anode, copper is the preferred electrode material. In order to remove excess heat from electrode 80 and prevent it from melting, electrode holder 82, fabricated from high thermal-conductivity material such as copper, is water-cooled by high-velocity fluid. This requirement also holds for the nozzle 100. Cooling fluid enters through inlet 88 and through the central passage 90 in cooling tube 92 and leaves through the annular passage 94 and bore 96 in electrode holder 82 and then through outlet 98. For successful operation at currents in the range of about 3000–10,000 amperes electrode 80 is about ½–1 inch diameter. As an example of the electrode cooling used, about 10 g.p.m. of water at 40 p.s.i.g. is supplied to the electrode holder 82 through a central entrance passage 90 about ½ inch diameter and an annular exit passage 94 about 1/16 inch wide.

Electrode 80 is protected from metal splash and furnace atmospheric gas contamination primarily by nozzle 100 which is positioned around and adjacent to the arcing tip 102 of electrode 80. When ½–1 inch diameter electrodes are used, central passage 104 of nozzle 100 should be about 9/16–1½ inches in diameter. As the electrode size increases up to about 2 inches in diameter, passage 104 will increase up to about 3 inches in diameter.

Nozzle 100 is water-cooled by flowing water at high velocity (greater than 100 ft./sec.) from inlet 106 into annular passage 108 and out through annular passage 110 and outlet 112. As an example of successful operation at about 3000–10,000 amperes, water at 40 g.p.m. and 200 p.s.i.g. is supplied to the annular nozzle cooling passages, such passages being about 1/64 inch wide. The nozzle is constructed from a high heat-conductivity material such as copper to prevent melting. This particular cooling arrangement, which is used in conjunction with concentric tubes 114, 116, and 118 of torch body 120, provides adequate cooling of the nozzle and torch body to prevent melting or other damage caused by arc heat or furnace metal contamination.

In large metal furnaces wherein high currents and voltages are used, there is increased danger of double arcing through the nozzle to the metal bath especially when the torch-to-scrap distance is less than about 4 inches with the torch operated at about 200 volts or more. It is therefore preferred that the nozzle have a refractory insulating liner 122 along the lower portion to protect against such double-arcing and attendant nozzle damage. It is desirable that arcing tip 102 of electrode 80 be positioned about ⅛–¼ inch inside passage 104 to increase arc stability and reduce cathode erosion. If the set-back is about ⅜ inch or more, there is a tendency for the arc to jump to the nozzle and then to the metal bath. Such double-arcing can destroy the nozzle. If the electrode extends an appreciable distance beyond the nozzle, an uneconomically excessive amount of shielding gas is required to protect the electrode.

As set forth previously, to further protect electrode 80 from contamination, a gas stream flows from inlet 124 through annular passage 126, down along electrode 80 and out through nozzle passage 104. Such gas stream provides directional stability to the arc column with which it is in intimate contact as it passes through passage 104. As the current increases beyond 10,000 amperes, it may be desirable to increase the shielding gas flow. Inert gases, such as argon and helium, are preferred, but other gases such as diatomic hydrogen and nitrogen may also be used to provide extra heat especially during meltdown. The gas flow must be such as to provide a minimum velocity of about 5–10 ft./sec. along the cathode in order to counteract the circulation of furnace gases into the electrode area caused by arc pumping.

When using arc currents of about 500–4000 amperes, a solid electrode 80 can be employed. However, as the current increases substantially above 4000 amperes, electrode erosion begins to become important. In this current range, it has been found that a hollow electrode of the type shown in FIG. 9 has advantages. Shielding gas, such as argon, then flows through the center of the electrode as well as around it. This combination reduces the electrode loss to less than 1–2 grams per hour for a ¾ inch diameter electrode at high current levels.

Figure 10:
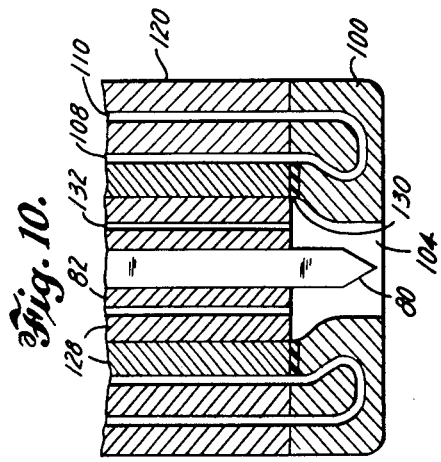
FIG. 10 is a cross-sectional view of a low-current transferred arc torch of this invention.

Another species of the present invention which is primarily useful in about 20–100 kw. power range for furnaces of less than about 1-ton capacity is shown in FIG. 10. In this form electrode 80 is about ⅛–½ inch diameter and nozzle passage 104 is about 5/16–½ inch diameter. Due to the decreased equipment size, the water-cooling supplied to torch body 120 and nozzle 100 through cooling passages 108 and 110 can be also used to cool electrode holder 82 and electrode 80. Water-supply pressures of 40–60 p.s.i. are sufficient for this purpose. Electrode holder 82 is thus positioned in thermal and electrical contact with electrode holder sleeve 128 that is directly cooled by the fluid in passage 108. Nozzle 100 and torch body 120 are electrically insulated from electrode holder sleeve 128 through insulator 130. Shielding torch gas flows through passages 132 in electrode holder 82 and out through passage 104 in nozzle 100. The gas stream is of the order of at least 20–50 s.c.f./hr. for operation in this power range.

Figure 8:
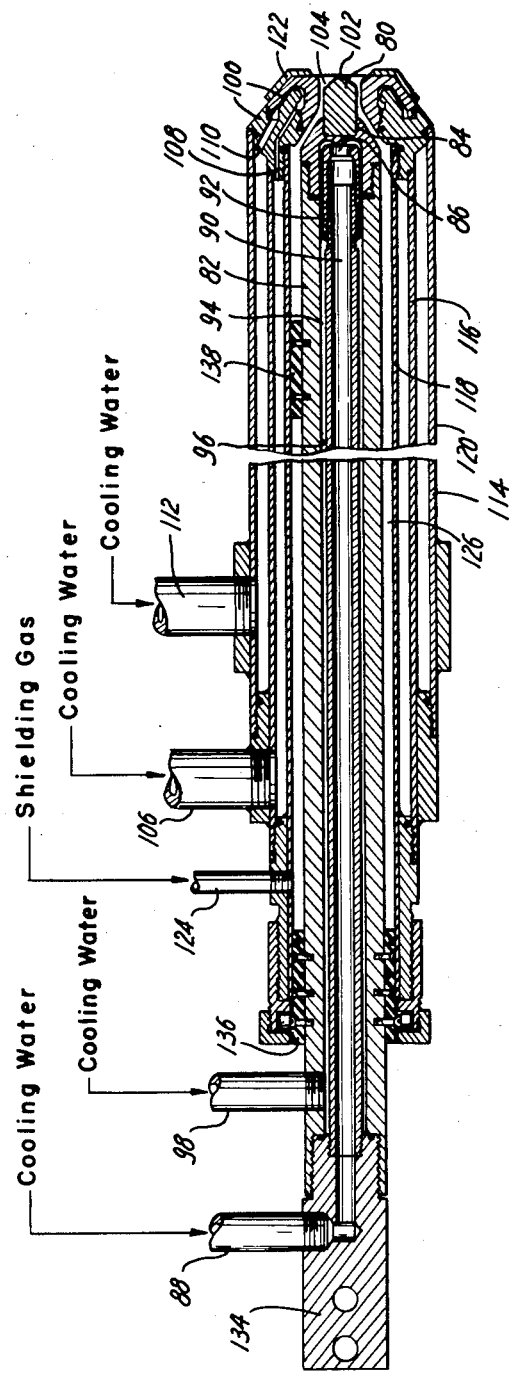
FIG. 8 is a cross-sectional view of a high-current transferred arc torch of this invention.

In the form shown in FIG. 8 electrical power is supplied directly to the electrode holder through connection 134 while the torch body is insulated from electrode holder 82 by insulator 136 and insulated spacer 138. The main arc from electrode 80 to the melt can be initiated in several ways. Electrode 80 could be extended through nozzle 100 until it contacts the melt electrode and then withdrawn to form the arc. A preferred method is to initiate a pilot arc of relatively low power between electrode 80 and nozzle 100. Such pilot arc thus provides sufficient ionized gas to initiate the main arc.

In the form shown in FIG. 10 electrical power is supplied either directly to electrode holder 82 or more conveniently through electrode holder sleeve 128 and then to electrode holder 82. The arc can be started by methods similar to those described above. In this form of torch as well as those of FIGS. 8 and 9, the outer portion of torch body 120 is preferably electrically insulated so as to minimize double-arcing problems. Also, refractory sleeves on the outside of the torch may be used for this purpose.

The apparatus of the present invention has been operated from both alternating- and direct-current power supplies. When operating from a direct-current power supply, successful meltdowns have been carried out with the arc torch electrode functioning either as a cathode or an anode.

Moreover, in the arc torch-metal melting furnace combination of this invention, the torch does not have to be operated in a substantially vertical position with respect to the melt. The torch of this invention has been operated for metal meltdowns at angles up to 70° from the vertical and the quasi-electrode (arc column) remained in axial alignment with the torch. That is, at the point of impingement the column remained at essentially 70° from the vertical. It is this exceptional directional stability of the arc column of the instant application which, as opposed to prior art apparatus, allows controlled angular impingement of the arc column on the metal charge. Operation of said torch at less than a right angle to the metal bath further reduces metal splash-back at the electrode and, in addition, provides more intense stirring action for the molten metal bath.

Basic studies of the characteristics of the arc column have indicated that for a successful operation of the arc torch of this invention, the environment, that is, the metal melting furnace must be maintained at an absolute pressure of at least about 1/20 of an atmosphere.

The utility and importance of the present invention can be demonstrated with particular reference to the melting and refining of metals and alloys such as iron, steel, titanium, nickel and the like. The torches of this invention can be operated for metal melting purposes in combination with skull-type furnaces, water-cooled crucible-type furnaces, refractory furnaces, and the like. Furthermore, any suitable A.C. or D.C. power supply capable of supplying adequate power to the apparatus can be used. In general, the apparatus and processes of this invention can be applied to a particular metal or group of metals in any of a variety of furnace shapes and sizes with changes in emphasis obvious to one skilled in the art.

The following examples of the arc-torch metal melting furnace combination clearly illustrate the unusual advantages which result from the use of the present invention in a number of applications.

EXAMPLE I

Cathode apparatus of the type shown in FIG. 8 was used. A 3/4-inch diameter tungsten electrode containing 1 percent thoria was positioned within a 1-inch diameter water-cooled copper nozzle. The tip of the cathode was recessed 0.14 inch from the nozzle outlet. Argon gas at 500 standard cubic feet per hour was passed around the cathode and out through the nozzle. An arc of 76–123 volts and 3100–6000 amperes direct current was maintained over a 2½–3 inch arc length between the cathode and a rotating water-cooled graphite anode. The 19-minute test resulted in an electrode weight loss of only 0.4 gram. This test serves to illustrate the non-consumability of the electrode.

EXAMPLE II

Figure 9:
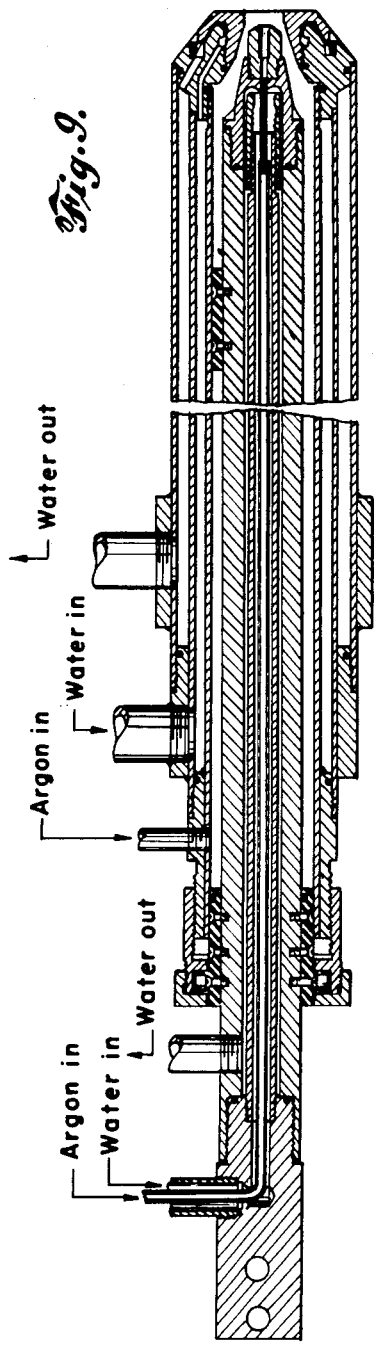
FIG. 9 is a cross-sectional view of a transferred arc torch of this invention.

Torch apparatus of the type shown in FIG. 9 was used. A 1-inch diameter thoriated tungsten electrode having a 3/8-inch diameter central gas passage was positioned within a 1¼-inch diameter water-cooled copper nozzle. The tip of the electrode was recessed ¼ inch from the nozzle outlet. Argon gas at 500 s.c.f./hr. passed around the electrode and out through the nozzle while 120 s.c.f./hr. argon passed through the torch electrode central passage. A pilot arc of 180 amperes was initiated by high frequency starting means between the electrode and the nozzle. This pilot arc provided the starting means for a 60-volt, 2000-ampere direct-current arc 2½ inches long between the torch electrode operating as a cathode and a cast-iron cylindrical billet 22 inches in diameter and 18 inches high surrounded by water-cooled copper coils. The iron billet constituted the anode. The arc length was increased to 5 inches and the electrical input increased to 4000 amperes direct current and 115 volts. At the end of 6 minutes, the arc had melted a 10-inch diameter portion in the top of the metal anode. While considerable amounts of molten metal had been splashed up on the torch body, there was no damage to the torch electrode which was operating as the cathode.

EXAMPLE III

The torch apparatus similar to that shown in FIG. 8 consisted of a ½-inch diameter thoriated tungsten electrode positioned within a ¾-inch diameter water-cooled copper nozzle. The tip of the electrode was recessed ⅛ inch from the nozzle outlet. Argon gas at 180–190 s.c.f./hr. passed around the torch electrode and out through the nozzle. A pilot arc of 175 amperes and 18 volts was continuously maintained between the torch electrode operating as cathode and the nozzle. This torch was mounted in the cover of a metal melting furnace and extended into the melting crucible, the contents of which constituted the anode. The crucible was 5 feet in diameter and about 5 feet deep with a 1-foot thick refractory lining. It contained 1000 lb. scrap steel, 70 lb. pig iron, and 50 lb. ingot iron for a 1120-lb. total charge. Electrical connection to the metal charge was maintained through three 2-inch diameter ingot iron rods which formed the bottom connection. An arc of 990 amperes D.C. and 160 volts was initiated between the cathode and the metal charge. About 45 minutes later, the arc power was increased to 2000 amperes and 177 volts. Ten minutes later, the power was increased to 2460–2500 amperes direct current and 165 volts. After about 2 hours, the metal charge was totally molten. The arc lengths were estimated to be between about 1 foot and about 2½ feet during meltdown. The run was continued for about an hour during which time the arc was periodically extinguished to take temperature readings of the bath and then reignited. At the end of this time the arc was extinguished and the molten charge was poured from the furnace. Examination of the electrode and nozzle indicated negligible damage or erosion. This particular example was the fifteenth test in this furnace using the same electrode and the same furnace lining.

This example illustrates the use of the apparatus of the present invention in a one-ton furnace at varying arc lengths and power inputs. Moreover, the compatibility of the use of the arc torch apparatus of this invention with standard furnace linings is demonstrated.

EXAMPLE IV

The apparatus similar to that of FIG. 10 consisted of a ¼-inch diameter tungsten electrode containing 2 percent thoria mounted flush with the outlet of a 5/16-inch I.D. water-cooled copper nozzle. This apparatus was mounted within a 12-inch I.D. furnace 8 inches deep having a 2½-inch thick refractory lining on the walls and a 4-inch thick lining on the bottom. The furnace contained about 50 lb. of ARMCO Ingot Iron punchings. Argon gas at 34 s.c.f./hr. was passed around the electrode and through the nozzle. An arc of about 25–50 volts and 600 amperes D.C. was initiated by touching the torch electrode operating as the cathode to the punchings operating as the anode and then withdrawing it to a distance of about ½ inch. Standard electrical connections were used. As the metal melted, the arc length gradually increased to about 2½ inches. No adjustment of the torch was necessary during the run. After 8 minutes, 31 s.c.f./hr. hydrogen was added to the argon stream and the voltage raised to 80–110 volts. This essentially doubled the power input. Temperature measurements taken with an immersion thermocouple indicated that the charge was completely molten after about 30 minutes. The arc was then maintained for about 15 minutes more at which time the melt was poured. The arc was intentionally extinguished just prior to pouring. The total energy required for melting was about the same as that of existing processes used with 50-lb. furnaces.

This particular example illustrates the use of the apparatus of the invention for metal melting in a 50-lb. capacity furnace. Specifically shown is the use of a flush-mounted torch electrode, stability of the arc without electrode-to-charge distance adjustment, the use of a mixture of argon and hydrogen as the shielding gas, and the possibility of increasing the power input at the same current level by the addition of a diatomic gas.

EXAMPLE V

A one-ton arc furnace was equipped with standard electrical connections and with an arc torch similar to that shown in FIG. 8 and comprising a ½-inch diameter thoriated tungsten electrode positioned with a ¾-inch I.D. water-cooled copper nozzle coated with a refractory. The tip of the electrode was recessed ⅛ inch from nozzle outlet. The furnace was charged with 1000 lb. scrap, 145 lb. ingot iron, and 48 lb. pig iron. The pilot arc and argon purge of 250–350 standard cubic feet per hour, (i.e., 37–52 ft./sec.) were turned on. The main arc was then turned on and operated at 150 volts, 900 amperes direct current, with the torch electrode functioning as cathode and the metal charge as anode. Over a period of about one hour the voltage was increased to 170 volts and the current to 2400 amperes. While in the furnace, the steel was very quiet and no bubbling was observed. The ingots were gas-free. The total meltdown time was about 101 minutes. Thirty-three percent meltdown efficiency, starting with a cold furnace, was obtained in this run.

This particular example is the sixteenth run in the one-ton furnace employing the same electrode and the same furnace lining. Moreover, this example illustrates the use of the apparatus of this invention for metal melting in a one-ton furnace. Specifically demonstrated is direct-current, straight-polarity operation at current levels up to 2400 amperes and argon flow rates up to 350 standard cubic feet per hour, the gas velocity past the torch electrode being from about 37 to about 52 feet per second.

EXAMPLE VI

A 50-lb. capacity furnace was equipped with standard electrical connections and an arc torch similar to that shown in FIG. 10 and comprising a ⅜-inch diameter nozzle and ¼-inch diameter thoriated tungsten electrode operated on direct current with the torch electrode as the cathode. The furnace was charged with 50 lb. of ARMCO ingot iron. Several runs were made at varying argon flow rates. The experimental results are compiled below in Table I.

*Table I*

EXPERIMENTAL RESULTS FOR EXAMPLE VI

| Gas Comp. | Gas Flow, s.c.f./hr. | Volts | Amps., D.C. | Arc Diameter (Inches— Meas. 1″ From Nozzle) |
|---|---|---|---|---|
| 100% A | 100 | 44 | 410 | .58 |
| 100% A | 50 | 42 | 410 | .63 |
| 100% A | 25 | 43 | 410 | .79 |
| None | 0 | 75 | 370 | .92 |
| 100% A | 13 | 43 | 410 | .83 |
| 100% A | 150 | 48 | 400 | .58 |
| 100% A | 200 | 50 | 400 | .54 |

Observations during the above experimental runs indicated that a gas flow of about 15 s.c.f./hr. past the electrode was necessary to obtain arc stability.

Color pictures taken during operation show that the arc was becoming noticeably diffused at flow rates between about 13 and about 25 s.c.f./hr. A blue mantle appeared on the outer fringe of the arc effluent indicating a possible copper erosion from the nozzle. As the gas flow was decreased, the blue mantle increased in intensity.

This example illustrates also the manifold purpose of the gas shield. This gas shield not only stabilizes the arc volume and protects the torch electrode, but also provides a boundary layer of relatively cold gas lining the interior of the nozzle and thus protects the nozzle from the arc.

EXAMPLE VII

*Investigation of Furnace Refractory Life*

The refractory life of a 50-lb. graphite electrode arc furnace was investigated. The furnace was operated in an inert atmosphere with the arc at a slight angle from the vertical. The arc was operated at short arc lengths (2 inches) to minimize refractory wear. During every graphite electrode run lasting at least one hour, ½ or more of the molten metal surface (about 10 inches in diameter) became covered with molten refractory. This illustrates the severe disadvantage when the graphite arc is used as a melting device. Very high-quality refractory linings have to be used. Instead of the original alumina-graphite ramming mix which held up well under the operation with the arc torch of the present invention, the furnace walls had to be lined with a chrome ore base ramming mix and the roof of the furnace with 99 percent alumina ramming mix. The chrome mix did not work for the furnace roof.

EXAMPLE VIII

*Operation of Arc Torch in a Furnace at an Angle*

An arc torch similar to that shown in FIG. 10 and comprising a ¼-inch thoriated tungsten electrode positioned within a ⁵⁄₁₆-inch water-cooled copper nozzle was successfully operated in a 50-lb. metal melting furnace at a 45° angle. A directionally stable, smooth arc torch column was maintained at normal operating gas flows of between 75 and 150 standard cubic feet of argon per hour. Maximum current input for this run was 580 amperes direct current with the torch electrode operating as cathode.

This example demonstrates the directionally stable operation of the apparatus when the arc torch is inclined at a 45° angle.

EXAMPLE IX

*Operation of a Reversed-Polarity Arc Torch*

An arc torch comprising a ¾-inch water-cooled copper electrode positioned within a ⅝-inch water-cooled copper nozzle and recessed about ¼ inch inside the nozzle was operated in a 50-lb. capacity furnace equipped with standard electrical connections and charged with 50 lb. of ingot iron. The torch was operated at 50 volts and 500 amperes direct current with the torch electrode operating as anode. The gas flow was 150 standard cubic feet of argon per hour. Meltdown time was about one hour. After the furnace charge was molten, nitrogen gas was introduced along with argon, this mixture constituting the gas flow. The gas flow was reduced to 100 s.c.f./hr. with the gas composition being 16.6 percent nitrogen with the balance, argon. Then the nitrogen flow was shut off and carbon monoxide gas mixed with argon was passed through the arc torch. The mixture consisted of 26.1 s.c.f./hr. of CO and 80 s.c.f./hr. of argon. The torch-furnace combination performed satisfactorily throughout the experiment.

This example specifically illustrates the use of a reversed-polarity apparatus for metal melting and also the use of argon-nitrogen and argon-carbon monoxide mixtures for shielding.

EXAMPLE X

*Operation of an Alternating-Current Arc Torch*

An arc torch similar to FIG. 8, comprising a 1-inch diameter thoriated tungsten electrode (1 percent thoria) positioned and recessed within a water-cooled copper nozzle was operated in a one-ton metal melting furnace equipped with standard electrical connections and charged with 270 lb. scrap, 350 lb. of ingots, and 15 lb. of ingot iron. The gas flow was about 450 standard cubic feet of argon per hour. A direct-current pilot arc was operated at 35 volts and 104 amperes. The main arc was operated at 150 R.M.S. volts and about 1200 to 1700 R.M.S. amperes. During the operation arc lengths of about 2½ feet were achieved.

This example illustrates the operation of the apparatus of this invention with alternating-current power input. Moreover, this example demonstrates the achievement of long arc lengths with a directionally stable arc column.

EXAMPLE XI

*Titanium Meltdown With Arc Torch*

An arc torch similar to that of FIG. 10 and comprising a ¼-inch thoriated tungsten electrode positioned within a ⁵⁄₁₆-inch water-cooled copper nozzle was used to melt 13 lb. of titanium buttons in a 15-lb. capacity water-cooled crucible metal melting furnace equipped with standard electrical connections. The torch was operated on direct current with the torch electrode operating as cathode. The gas passed through the torch was argon.

This example illustrates the meltdown of a nonferrous metal.

EXAMPLE XII

*The Use of Reactive Gas in Transferred Arc Torch Furnace*

A 50-lb. furnace was equipped with standard electrical connections and an arc torch similar to that shown in FIG. 10. The torch housed a ¼-inch thoriated tungsten electrode positioned within a 5/16-inch inside diameter water-cooled nozzle. Four 1/16-inch diameter drilled holes were provided for the introduction of a reactive gas into the arc column below the torch electrode. Operating at 500 amperes straight-polarity direct current and 47 volts with 100 standard cubic feet of pure argon flowing through the nozzle, the torch melted 50 lb. of ingot iron. Following the completion of the meltdown, CO was injected into the arc column at 12 standard cubic feet per hour. In a series of six steps, the CO flow was increased to 120 standard cubic feet per hour. Maximum arc voltage attained during the injection of CO was 70 volts. After a fifteen-minute injection period, the CO was turned off and the metal poured.

This example illustrates the use of a reactive gas in the apparatus of this invention.

The unique properties of the present invention may readily be seen from the above examples and descriptions. The use of the arc torch with its extremely high temperature and directionally stable arc column as a quasi-electrode makes possible arc furnace operations heretofore impossible. The ionized gas stream provides a semi-rigid directionally stable path for the arc current thus preventing arc wander and other inherent instabilites characteristic of a carbon arc. Also much higher current densities are possible than with a carbon arc as well as a much longer arc length with attendant increase in power input to the melt.

The combination of the nozzle surrounding the electrode and the annular gas stream shields said electrode from erosion due to metal splash and spatter. This factor increases the life of the electrode almost indefinitely, eliminates electrode contamination of the melt, and further increases arc stability. The extreme arc stability, non-sensitivity to spacing of the electrode above the melt, and freedom from electrode erosion make the provision of cumbersome and expensive electrode positioning apparatus unnecessary.

While certain preferred embodiments of the invention have been disclosed and described, it is to be understood that certain modifications and changes could be made by a person skilled in the art without departing from the spirit and scope thereof.

What is claimed is:

1. In an electrical metal processing furnace, means for producing a directionally stable current carrying stream of substantially ionized gas containing a high pressure high power transferred arc, such means comprising two electrodes, one of which is the metal to be processed and the other is a non-consumable electrode surrounded by an essentially non-consumable nozzle having a constricted outlet portion in axial alignment with said non-consumable electrode with said non-consumable electrode extending into said constricted outlet portion to produce and direct a quasi-electrode and control the momentum thereof in such furnace.

2. An electric arc metal processing furnace comprising means for holding material to be heated, a plurality of electrodes, at least one of which is a quasi-electrode and consists of a substantially ionized gas stream containing a high pressure high power transferred arc established between a non-consumable electrode and the material to be heated; said stream being directed on such material in said holding means, an essentially non-consumable nozzle surrounding said non-consumable electrode and having a constricted outlet portion in axial alignment with said non-consumable electrode with said non-consumable electrode extending into said constricted outlet portion and means for connecting said electrodes to a suitable source of electrical power for the purpose of energizing such high pressure arc.

3. The combination with a crucible for metal to be melted, of means for melting such metal comprising non-consumable electrode means for producing a high-pressure electric arc between the electrode and the metal, means for directionally stabilizing said high-pressure arc energized between such metal and said electrode which last named means comprises a nozzle surrounding such electrode and having a constricted outlet portion in axial alignment with said non-consumable electrode with said non-consumable electrode extending into said constricted outlet portion and an annular gas stream which surrounds the electrode and is directed into intimate contact with the arc whereby a substantial portion thereof is ionized, and means for connecting said metal and torch to a suitable source of electrical power.

4. An arc furnace comprising the combination with a crucible and means for electrically connecting said crucible to one side of a source of electrical power, of an arc torch including a non-consumable electrode, and means for electrically connecting said electrode to the other side of such electrical power source to produce a high-pressure arc, said arc torch being provided with nozzle means surrounding and forming an annular passageway with said electrode, said nozzle means having a constricted outlet portion in axial alignment with said non-consumable electrode with said non-consumable electrode extending into said constricted outlet portion, means supplying a gas stream having a velocity of at least 5 feet per second which surrounds the electrode in the annular passageway and which is forced into intimate contact with said arc by said nozzle means where it is heated and ionized to form an effluent which together with said high-pressure arc functions as a quasi-electrode for the furnace.

5. An electric arc furnace as set forth in claim 4 above further comprising the combination of means providing a closed chamber for said crucible and torch, and means for supplying gas inert with respect to the furnace charge to said torch and thence to said chamber.

6. An electric arc furnace as set forth in claim 4 above further comprising the combination of means providing a closed chamber for said crucible and torch, and means for supplying a reactive gas to said torch and thence to said chamber which will produce a desired chemical reaction in the metal charge within the chamber.

7. An electric furnace as set forth in claim 6 wherein the reactive gas fed to the torch would react with the electrode and wherein means are provided for introducing the said gas into the annular gas stream in such manner that it does not contact the electrode.

8. An electric arc furnace including a crucible for containing a material to be melted and an arc torch for establishing a quasi-electrode containing a high pressure, high power transferred arc, said arm torch having a water-cooled outer jacket extending from a first end thereof adapted for insertion through the furnace wall to a second end equipped with a nozzle having cooling passages and a constricted axial opening therein, an electrode holder extending axially through said torch and spaced from said outer cooling jacket which supports an electrode extending within the constricted opening on the nozzle, means for supplying a gas stream into the space between the electrode holder and the cooling jacket whereby an annular gas stream is passed around the electrode and out through the nozzle, electric power means connected to the torch and the material in the crucible for producing a high pressure arc between the electrode and the material in the crucible, and wherein the nozzle is shaped to cause the annular gas stream to come into intimate contact with the arc where it is at least partially ionized and together with said arc forms a highly conductive, directionally stable, quasi-electrode.

References Cited in the file of this patent

UNITED STATES PATENTS

| | | |
|---|---|---|
| 1,002,721 | Mathers | Sept. 5, 1911 |
| 2,167,575 | Kelly | July 25, 1939 |
| 2,516,016 | Pakala | July 18, 1950 |
| 2,587,331 | Jordan | Feb. 26, 1952 |
| 2,768,279 | Rava | Oct. 23, 1956 |
| 2,806,124 | Gage | Sept. 10, 1957 |